United States Patent
Shi

(10) Patent No.: US 9,619,064 B2
(45) Date of Patent: Apr. 11, 2017

(54) STRUCTURE WITH INTEGRATED ACOUSTICS FUNCTION

(71) Applicant: Corning Incorporated, Corning, NY (US)

(72) Inventor: Zhiqiang Shi, Shrewsbury, MA (US)

(73) Assignee: Corning Incorporated, Corning, NY (US)

(*) Notice: Subject to any disclaimer, the term of this patent is extended or adjusted under 35 U.S.C. 154(b) by 162 days.

(21) Appl. No.: 14/437,989

(22) PCT Filed: Oct. 23, 2013

(86) PCT No.: PCT/US2013/066273
§ 371 (c)(1),
(2) Date: Apr. 23, 2015

(87) PCT Pub. No.: WO2014/066448
PCT Pub. Date: May 1, 2014

(65) Prior Publication Data
US 2015/0301668 A1   Oct. 22, 2015

Related U.S. Application Data

(60) Provisional application No. 61/718,980, filed on Oct. 26, 2012.

(51) Int. Cl.
  *G06F 3/043*   (2006.01)
  *G06F 3/041*   (2006.01)
  *H04R 23/00*   (2006.01)

(52) U.S. Cl.
  CPC ............ *G06F 3/0412* (2013.01); *G06F 3/041* (2013.01); *H04R 23/002* (2013.01)

(58) Field of Classification Search
None
See application file for complete search history.

(56) References Cited

U.S. PATENT DOCUMENTS

2009/0268563 A1* 10/2009 Jiang .................... H04R 23/002
                                                        367/140
2009/0279390 A1   11/2009 Jiang et al.
(Continued)

FOREIGN PATENT DOCUMENTS

WO   2011107665 A1   9/2011
WO   2012090032 A    7/2012

OTHER PUBLICATIONS

Xiao et al.; "Flexible, Stretchable, Transparent Carbon Nanotube Thin Film Loudspeakers", Nano Letters, American Chemical Society, US, vol. 8, No. 12, Oct. 29, 2008; pp. 4539-4545.
(Continued)

*Primary Examiner* — Ifedayo Iluyomade

(57) ABSTRACT

Embodiments disclosed herein include a device with an integrated acoustics function that includes a patterned touch screen cover, an acoustic thin film, a plurality of electrodes, and a substrate. In some embodiments, the substrate is coupled to the acoustic thin film and reduces heat loss from the acoustic thin film through the substrate. The acoustic thin film may be coupled to the patterned touch screen cover and conducts an oscillating electrical current provided by the plurality of electrodes, thereby acting as a nano-scale acoustic generator. In still some embodiments, the patterned touch screen cover provides an array of microspeakers and a viewing area, where the array of microspeakers is disposed around a perimeter of the patterned touch screen cover.

21 Claims, 4 Drawing Sheets

(56) References Cited

U.S. PATENT DOCUMENTS

| | | |
|---|---|---|
| 2009/0296528 A1 | 12/2009 | Jiang et al. |
| 2010/0098272 A1 | 4/2010 | Jiang et al. |
| 2010/0098273 A1 | 4/2010 | Jiang et al. |
| 2013/0050113 A1 | 2/2013 | Brown |
| 2013/0136280 A1* | 5/2013 | Stephanou ............. H04R 17/00 381/190 |
| 2013/0272557 A1 | 10/2013 | Ozcan et al. |

OTHER PUBLICATIONS

European Patent Office; "International Search Report"; Mail Date: Jan. 28, 2014; pp. 1-4.

\* cited by examiner

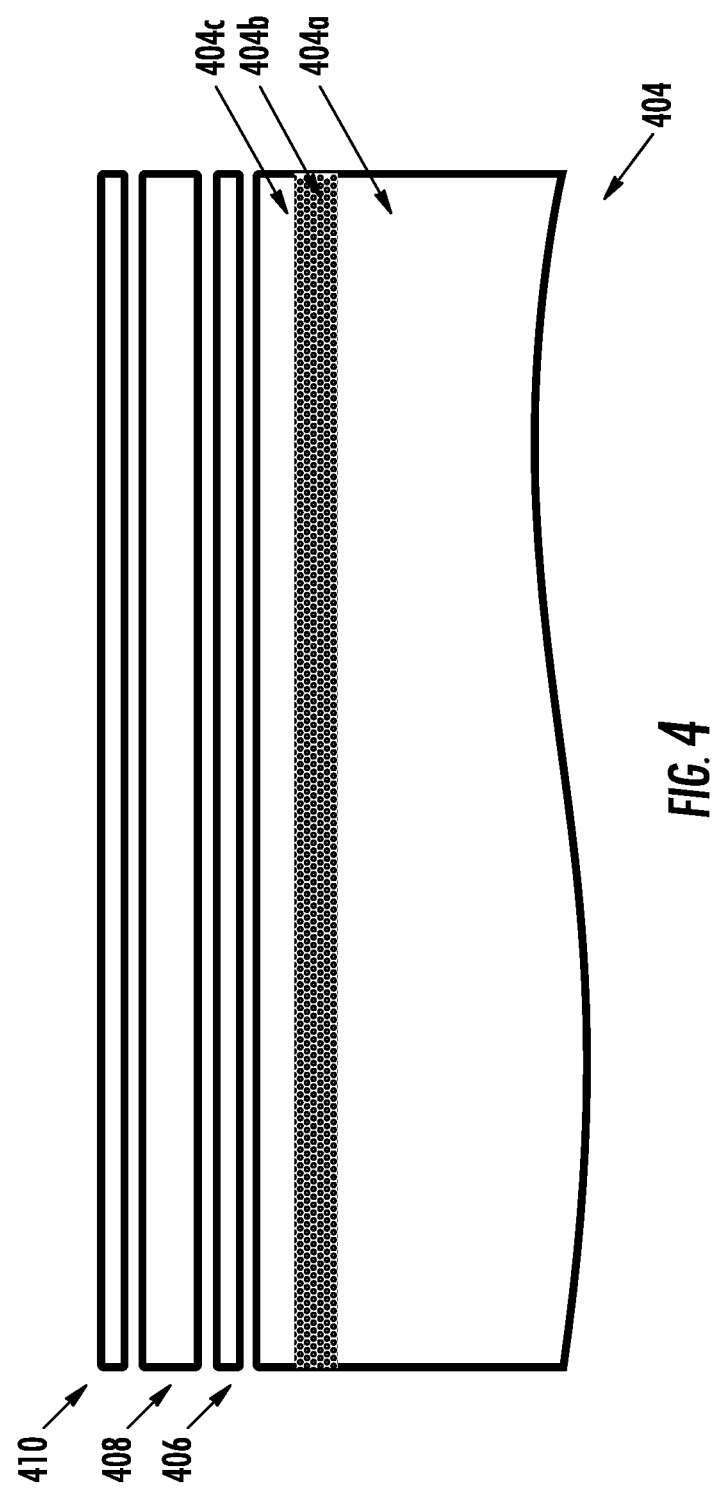

STRUCTURE WITH INTEGRATED ACOUSTICS FUNCTION

CROSS-REFERENCE TO RELATED APPLICATIONS

This application claims the benefit of priority under 35 U.S.C. §119 of U.S. Provisional Application Ser. No. 61/718,980 filed on Oct. 26, 2012, the content of which is relied upon and incorporated herein by reference in its entirety.

BACKGROUND

1. Field

The present disclosure generally relates to a structure with an integrated acoustics function and, more specifically, to embodiments of a touch screen device with an array of microspeakers for providing the acoustics function.

2. Technical Background

As electronic devices become more advanced, consumers now demand that the devices include audio capabilities, and in some cases touch screen displays. However, incorporating a traditional cone speaker onto such the electronic device is often difficult and increases the size of the device. While traditional cone speakers have become smaller, a desire exists to further reduce the size of electronic devices.

SUMMARY

Embodiments disclosed herein include a device with an integrated acoustics function that includes a patterned touch screen cover, an acoustic thin film, a plurality of electrodes, and a substrate. In some embodiments, the substrate is coupled to the acoustic thin film and reduces heat loss from the acoustic thin film through the substrate. The acoustic thin film may be coupled to the patterned touch screen cover and conducts an oscillating electrical current provided by the plurality of electrodes, thereby acting as a nano-scale acoustic generator. In some embodiments, the patterned touch screen cover provides an array of microspeakers and a viewing area, where the array of microspeakers is disposed around a perimeter of the patterned touch screen cover.

BRIEF DESCRIPTION OF THE DRAWINGS

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate various embodiments described herein, and together with the description serve to explain the principles and operations of the claimed subject matter.

FIG. 4 depicts a side view of an electronic device, including a porous layer in the substrate, according to embodiments disclosed herein.

DETAILED DESCRIPTION

Embodiments disclosed herein include a multi-layer structure having a transparent, translucent, and/or colored conductive thin film (such as a thin carbon nanotube, graphene, metal nanowire, ITO (indium tin oxide), PEDOT Poly(3,4-ethylenedioxythiophene) or other transparent conductive thin film) residing between two glass sheets, with electrodes fabricated between the glass surface and the acoustic thin film for functioning as a nano-scale acoustic generator. These layers may be patterned to optimize both the audio and video performance of the electronic device. One or both of the glass sheets can include a thin cover layer. Sound is produced based on a thermal-acoustic effect by applying oscillating electrical current of an audio frequency to the thin conductive film such as carbon nanotube thin film. This generates oscillating heat inside the film which creates temperature oscillation in the adjacent ambient interface, which in turn creates acoustic pressure oscillation in the surrounding air. As a consequence, the sound is created without vibration of the layers. Accordingly, the glass layers may protect the transparent, translucent, and/or colored conductive thin film such as the carbon nanotube thin film from damage, as well as enable the thermal exchange between the transparent, translucent, and/or colored conductive thin film and the surrounding air.

Figure 1:
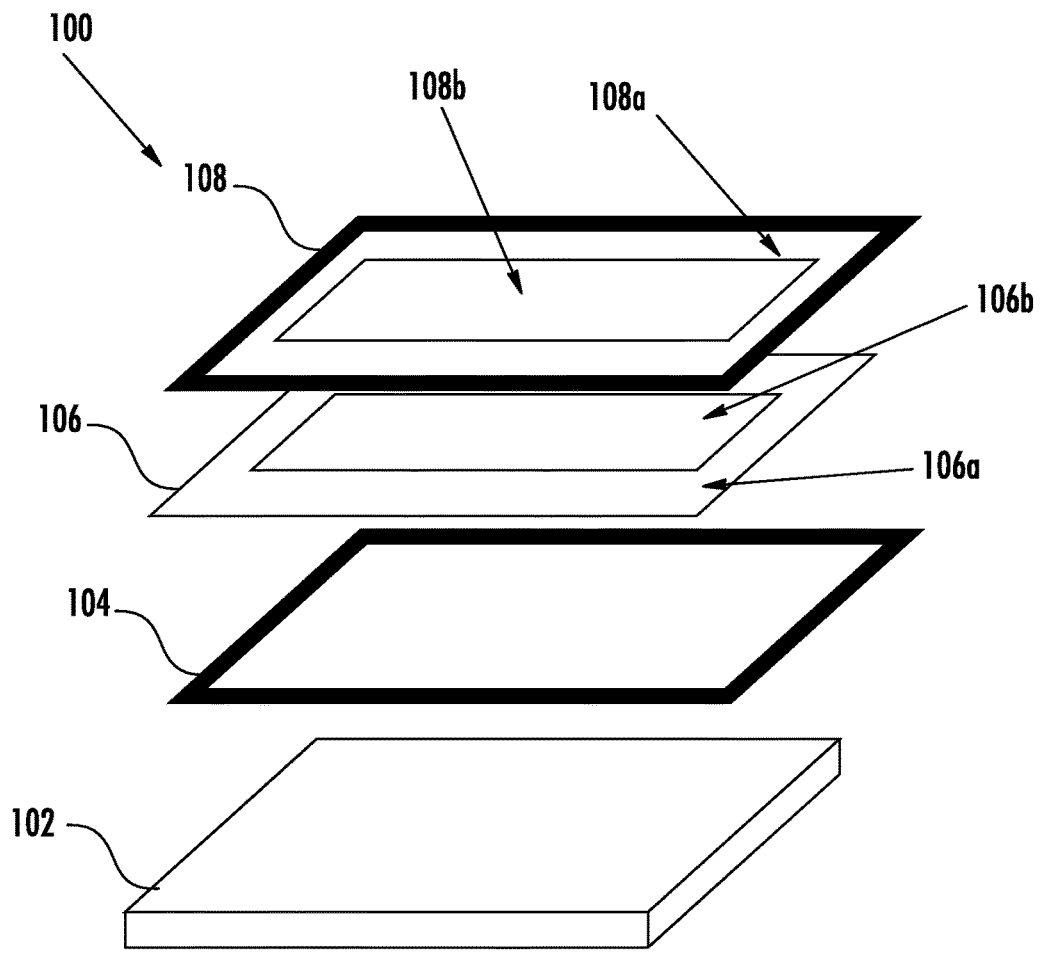
FIG. 1 depicts a perspective view of various components of an electronic device, which includes a touch screen with an integrated acoustics function, according to embodiments disclosed herein.

Referring now to the drawings, FIG. 1 depicts a perspective view of various components of an electronic device 100, which includes a touch screen cover 108, such as a glass touch screen cover with an integrated acoustics function, according to embodiments disclosed herein. As illustrated, the electronic device 100 includes an electronic component 102 with an integrated visual function (which may include an imagery source for providing imagery, such as electronic imagery), a substrate 104, an acoustic thin film 106, and the touch screen cover 108. The electronic component 102 may be configured as the electronic or computing hardware of a mobile telephone, tablet, or other device for providing image and audio signals for display. As discussed in more detail below, the electronic device 100 may also provide audio signals via electrodes that are coupled to the acoustic thin film 106 for creating audio via the touch screen cover 108. Accordingly, the substrate 104 may be constructed of glass or other similar material and may be configured as a heat insulator to reduce the amount of heat generated by the electrodes that escapes into the electronic component 102. The substrate 104 may be configured as a rigid or flexible material and may be configured for receiving and/or securing one or more electrodes.

Coupled to the substrate 104 is the acoustic thin film 106. The acoustic thin film 106 may be constructed of carbon nanotube materials or other materials with similar properties and thus may be constructed as a nanostructure film. Depending on the particular materials used, the acoustic thin film 106 may have a thickness between about 0.5 micron and about 1.0 micron and provide an electrical resistance between about 6 ohms and about 15 ohms. The acoustic thin film 106 may also have a film length and a film width that substantially matches the cover length and cover width of the touch screen cover 108. Depending on the particular embodiment, the plurality of electrodes may be coupled between the acoustic thin film 106 and the substrate 104. Accordingly, in response to a request for an audio signal, the electronic component 102 may send an electrical signal (one or more) to the plurality of electrodes. The plurality of electrodes may accordingly, emit an electrical signal (one or more) that corresponds with the desired sound. Additionally, depending on the particular embodiment, the acoustic thin film 106 may provide flexibility, transparency, and/or translucency to provide the desired visual effects of the electronic device 100.

As is also illustrated, the acoustic thin film 106 may be constructed as a patterned nano carbon film. Specifically, the acoustic thin film 106 includes a patterned portion 106a and a non-patterned portion 106b. The patterned portion 106a may be disposed along a perimeter of the acoustic thin film 106 and may be pattered to facilitate communication of the electrical signals to the acoustic thin film for creation of heat. Similarly, the touch screen cover 108 may have a cover length and a cover width and include a patterned portion 108a and a non-patterned portion 108b. The patterned portion 108a may be disposed along the perimeter of the touch screen cover 108 and may be configured to transfer heat from the patterned portion 106a of the acoustic thin film 106 through an array of microspeakers, which are defined by the patterned portion 108a of the touch screen cover 108. When the heat is transferred through the microspeakers, the oscillating heat creates a thermal-acoustic effect by creating an acoustic pressure oscillation in the surrounding air.

Accordingly, the high-efficiency thermal-acoustics effect is created from the acoustic thin film 106, such as a carbon nano-tube thin film with flexible glass material and manufacturing process so that acoustic (audio) function can be realized directly on the glass. The equation below explains a mechanism for the acoustic function, where $P_{rms}$ is the root-mean-square of acoustic pressure (sound wave in air), $P_{input}$ is the input power (electrical), $C_s$ is the heat capacity per unit area of the thin film conductor; f is the frequency; r is the propagation distance; $\tau_0$, $T_0$ and $\alpha$ are the density, temperature, thermal diffusivity of the ambient air respectively.

$$P_{rms} = \frac{\sqrt{\alpha}\,\rho_0}{2\sqrt{\pi}\,T_0} \cdot \frac{1}{r} \cdot P_{input} \cdot \frac{\sqrt{f}}{C_s}.$$

This equation predicts higher sound pressure ($P_{rms}$) with increased electrical input ($P_{input}$), higher frequency ($\sqrt{f}$) and lower heat capacity per unit area $C_s$ which is related to the mass specific heat capacity and surface density of the thin film, whereas the latter is the intrinsic material parameter. The table below compares the properties of carbon nanotube film layer and platinum foil. While either material may be used for the acoustic thin film 106 (or other materials with similar properties), the table provides that the low surface density of carbon nanotube film is the major driver for low $C_s$, which translates to an approximate 48 dB (=20×log(2/7.7×10$^{-3}$) higher in sound pressure level than the 7 micron platinum foil.

TABLE

| | Carbon nanotube | Platinum foil | Glass |
|---|---|---|---|
| Film thickness (m) | | $7 \times 10^{-7}$ (0.7 um) | $0.05 \sim 1 \times 10^{-3}$ (50~100 um) |
| Density (kg/m$^3$) | | 21,450 | 2,440 |
| Surface density (kg/m$^2$) | $\sim 1.27 \times 10^{-5}$ | $1.5 \times 10^{-2}$ | 0.122~244 |
| Specific heat (J/kg · K) | 500 | 133 | 840 |
| Cs (J/m$^2$ · K) | $\sim 7.7 \times 10^{-3}$ | 2.0 | 102~205 |

A Low $C_s$ with relatively high resistance of the carbon nanotube materials leads to instantaneous heating of the acoustic thin film 106. When oscillating current (audio signal input) is applied, this leads to temperature oscillation of the acoustic thin film 106, which in turn causes thermal expansion and contraction in the adjacent air that produces sound waves.

Figure 2:
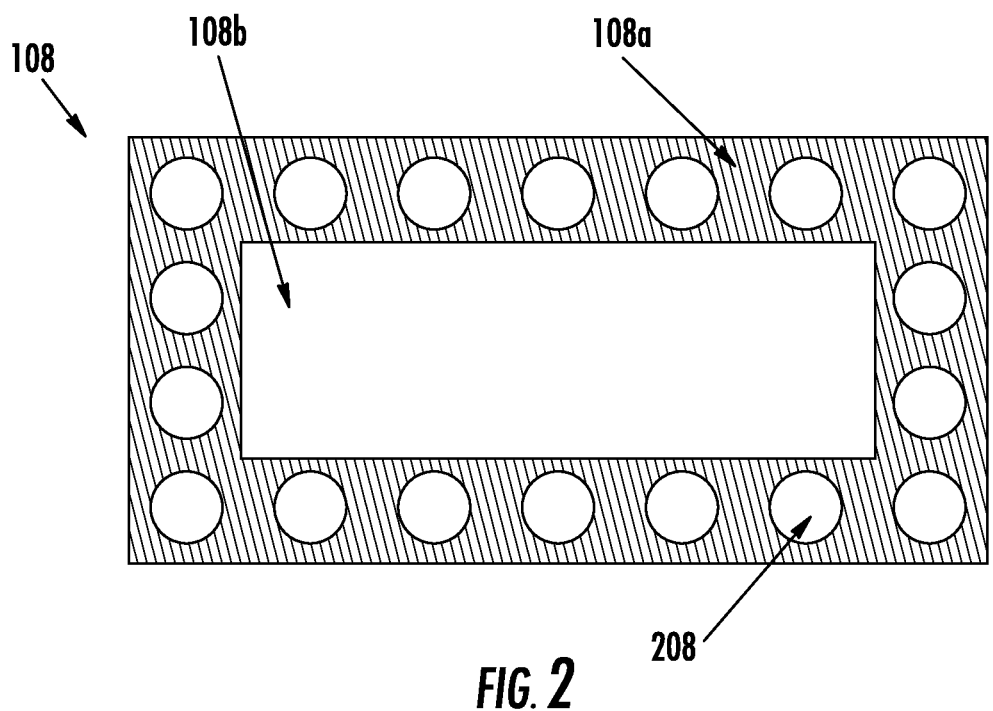
FIG. 2 depicts an overhead view of a touch screen with a plurality of microspeakers for providing the acoustics function, according to embodiments disclosed herein.

FIG. 2 depicts an overhead view of a touch screen cover 108 with a plurality of microspeakers for providing the acoustics function, according to embodiments disclosed herein. As illustrated, the touch screen cover 108 includes a patterned portion 108a disposed around a perimeter of the touch screen cover 108, and a non-patterned portion 108b disposed on an interior portion of the touch screen cover 108 within a viewing area of the electronic device 100. As also illustrated, the patterned portion 108a defines a plurality of microspeakers 208 that allow transfer of the oscillating heat through the touch screen cover 108.

For thermal-acoustic sound generation, it is important to have efficient heat exchange between the acoustic thin film 106 and the ambient air through the touch screen cover 108. However, because the touch screen cover 108 may have an intrinsic thermal barrier, embodiments disclosed herein include the patterned touch screen cover 108 with at least one open channel or aperture that exposes the acoustic thin film 106 to the ambient. High density of such features makes it possible to provide optimum direct air surface contact between about 10% to about 90% of total surface area. It can be envisioned that the size and pitch of the microspeaker can be optimized based on acoustic output. Patterning of the microspeaker either in the entire touch screen cover 108 surface or only partially (as shown in FIG. 2), either uniform or un-uniform in hole sizes, and distribution of such feature in selected area or areas can be designed and optimized to suit the application. Arrays of microspeakers could be produced on the touch screen cover 108 surface for optimized acoustic performance in the targeting field.

Figure 3:
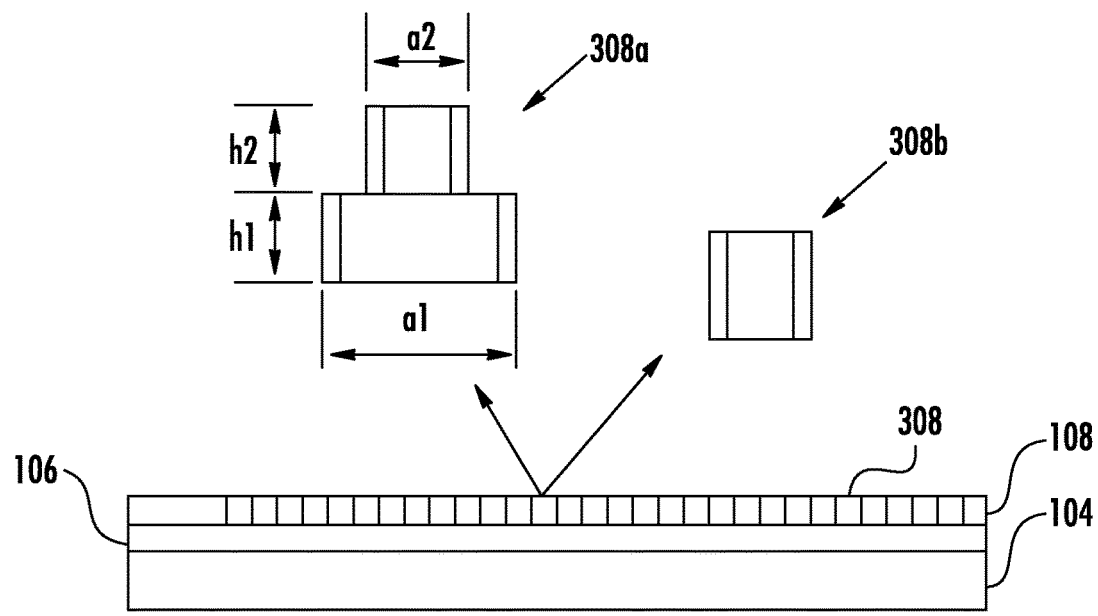
FIG. 3 depicts a side view a touch screen, including a plurality of microstructures, according to embodiments disclosed herein.

FIG. 3 depicts a side view a touch screen cover 108, including a plurality of microstructures 308, according to embodiments disclosed herein. As illustrated, the microstructures 308 may be configured as a plurality of apertures with nanotubes deposited on at least one sidewall of the microstructures 308. In some embodiments, the microstructures 308 may be configured as a dual structure microstructure 308a, while in some embodiments may be configured as a single structure microstructure 308b. The dual structure microstructure 308a may be configured with a first section with a width a1 and a first height h1. The second section may be configured with a second width a2 with a second height h1. As illustrated, both the first section and the second section have nanotubes deposited on the sidewalls.

Depending on embodiment, the microstructures 308 may be approximated as radial micro-Helmholtz resonators, an acoustic feature that can be exploited to amplify the sound. The dimensional features, a1, a2, h1, and h2 may be designated such that the resonance falls to the audible frequency range. Further, it is possible to make features of different dimensions to cover a broad range of frequencies in the audio range for optimized sound spectrum.

The microstructures may be created with any of a plurality of different processes. As an example, it can be fabricated in a thin glass sheet in large format using laser processing and/or by a process that utilizes vias in a thin sheet glass for glass interconnects. Some embodiments may include leveraging surface texturing on thin film sheet glass in glass rolling.

Once the textured thin-glass sheet is created, it can be sent to a process for depositing the conductive nanomaterials on the surface and side walls of the microstructures 308. The microstructures 308 may include high aspect ratio molecular (HARM) structures. The HARM structure may be deposited both on the back side of the sheet glass and onto the side walls of the apertures. The distribution of such apertures as patterns on the glass can be designated to provide the high quality audio effect that is compatible with other performance functions of the glass such as display and touch.

FIG. 4 depicts a side view of an electronic device 100, including an implant layer 404b (which may be porous) in the substrate 404, according to embodiments disclosed herein. As illustrated, the substrate 404 may include a base layer 404a, an implant layer 404b, and a surface layer 404c. The base layer 404a and the surface layer 404c may be constructed of the glass substrate. The implant layer 404b may be constructed of a plurality of gas pockets within the substrate, for holding a predetermined gas, such as argon and/or nitrogen. The implant layer 404b may be about 0.3 microns thick and may be utilized to insulate the heat transfer from the acoustic thin film layer 406 through the substrate. The implant layer 404b may reside about 0.3 micron below the surface of the substrate. Also included is the touch screen cover 408, with an external thin film layer 410, which may be constructed of carbon nano tubes or other similar structure.

In some embodiments the external thin film layer 410 may be constructed as a thin-sheet porous glass substrate that is constructed of carbon nanotube, graphene, or other similar material that is deposited into the porous structure of the glass substrate. The porosity of the glass may range from about 10% to about 60% (or higher), with a mean pore size on the micron level. The external thin film layer 410 may be about 10 nanometers to about 1000 nanometers thick on the top surface of the touch screen cover 408. The high porosity provides a large surface area for depositing the carbon nanotube or graphene materials. As such, this configuration may increase the surface contact between the carbon nanotube or graphene materials with the air to create high sound pressure levels. This may also decrease heat conducted to the substrate 404.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

Therefore, at least the following is claimed:

1. A device with an integrated acoustics function comprising a patterned touch screen cover, an acoustic thin film, a plurality of electrodes, and a substrate, wherein:
   the substrate is coupled to the acoustic thin film and reduces heat loss from the acoustic thin film through the substrate;
   the acoustic thin film is coupled to the patterned touch screen cover and conducts an oscillating electrical current provided by the plurality of electrodes, thereby acting as a nano-scale acoustic generator;
   the patterned touch screen cover provides an array of microspeakers and a viewing area, where the array of microspeakers is disposed around a perimeter of the patterned touch screen cover;
   the patterned touch screen cover transfers heat via the array of microspeakers to create acoustic pressure in surrounding air, thereby producing a desired sound without creating vibration in the patterned touch screen cover; and
   the patterned touch screen cover receives touch-based user inputs to control operation of at least a portion of the device.

2. The device of claim 1, wherein the substrate is constructed substantially of glass.

3. The device of claim 1, wherein the substrate comprises a porous layer disposed just below a surface of the substrate.

4. The device of claim 3, wherein the porous layer comprises gas pockets that hold a predetermined gas, wherein the porous layer further decreases heat transfer from the acoustic thin film through the substrate.

5. The device of claim 4, wherein the predetermined gas comprises at least one of the following: argon and nitrogen.

6. The device of claim 4, wherein the porous layer has a thickness between about 0.2 micron and about 1.0 micron.

7. The device of claim 1, wherein the acoustic thin film comprises a nanostructure film that is applied between the patterned touch screen cover and the substrate.

8. The device of claim 7, wherein the nanostructure film comprises a nano carbon film.

9. The device of claim 1, wherein the acoustic thin film has a thickness between about 0.5 micron and about 1 micron.

10. The device of claim 1, wherein the acoustic thin film provides an electrical resistance between about 6 ohms and about 15 ohms.

11. The device of claim 1, wherein the acoustic thin film is patterned.

12. The device of claim 1, wherein the acoustic thin film has a film length that substantially matches a cover length of the patterned touch screen cover and a film width that substantially matches a cover width of the patterned touch screen cover.

13. The device of claim 1, wherein the acoustic thin film is only disposed along the perimeter of the patterned touch screen cover.

14. The device of claim 1, wherein the patterned touch screen cover is constructed substantially of glass.

15. The device of claim 1, wherein the patterned touch screen cover is patterned with microstructures.

16. The device of claim 15, wherein at least one of the microstructures comprises an aperture with a nanotube deposited on a sidewall of the aperture.

17. The device of claim 15, wherein the microstructures comprise a first section and a second section, wherein the first section comprises a width greater than a width of the second section.

18. The device of claim 1, further comprising an external thin film that is coupled to the patterned touch screen cover, opposite to the acoustic thin film.

19. The device of claim 1, wherein the acoustic thin film comprises at least one of the following features: flexibility, transparency, and translucency.

20. The device of claim 1, wherein the substrate, the acoustic thin film, and the patterned touch screen cover are translucent to provide imagery from an imagery source, through the substrate, the acoustic thin film, and the patterned touch screen cover.

21. A device with an integrated visual function and an integrated acoustics function comprising a glass touch screen cover, a nano carbon film, a plurality of electrodes, a glass substrate, and an imagery source, wherein:

the glass substrate is coupled to the nano carbon film and reduces heat loss from the nano carbon film through the glass substrate;

the nano carbon film is coupled to the glass touch screen cover and conducts an oscillating electrical current provided by the plurality of electrodes, thereby operating as a nano-scale acoustic generator;

the glass touch screen cover transfers heat via an array of microspeakers along a perimeter of the glass touch screen cover to create acoustic pressure in surrounding air, thereby producing a desired sound without creating vibration in the glass touch screen cover;

the imagery source is coupled to the glass substrate to provide electronic imagery; and the glass substrate, the nano carbon film, and the glass substrate are substantially transparent to provide the electronic imagery from the imagery source through the glass touch screen cover.

* * * * *